July 22, 1941.  C. D. THOMS  2,249,796
AERATING AND DISPENSING DEVICE
Filed Aug. 10, 1939
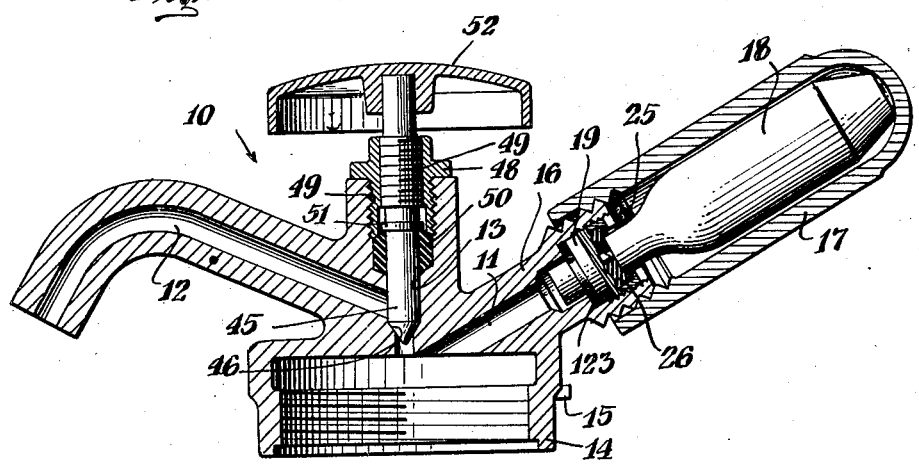
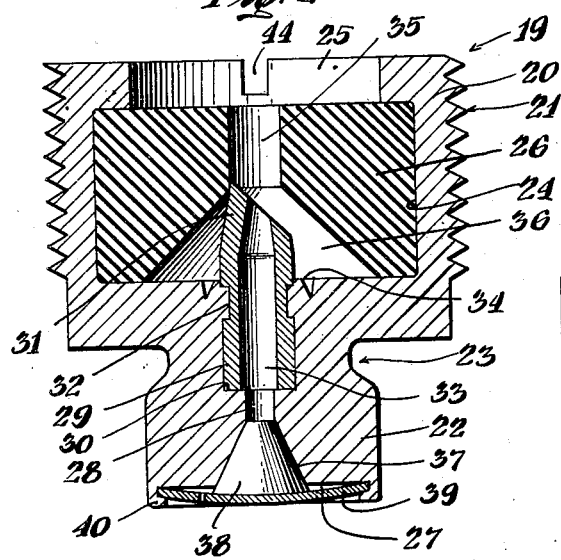
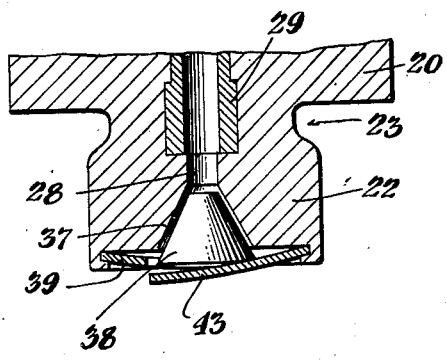
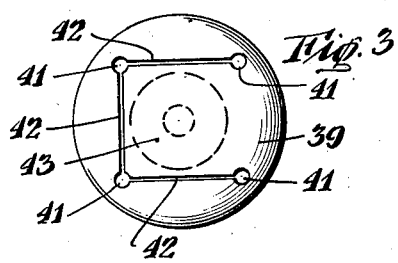
INVENTOR
Charles Davis Thoms
BY
Watson, Bristol, Johnson & Leavenworth
ATTORNEYS Patented July 22, 1941

2,249,796

UNITED STATES PATENT OFFICE 2,249,796

AERATING AND DISPENSING DEVICE

Charles Davis Thoms, New York, N. Y., assignor to Food Devices Incorporated, New York, N. Y., a corporation of Delaware Application August 10, 1939, Serial No. 289,383

4 Claims. (Cl. 225—18)

The present invention relates to devices for aerating and dispensing liquids, fluent creams or pastes and the like; such as food products, e. g. milk, cream, mixtures thereof, water, various beverages, mayonnaise, batters, icings and their ingredients, syrupy confections, etc.; as well as cosmetic preparations such as face creams and other fluent compositions adapted for external application. For the sake of convenience such materials will be hereinafter collectively referred to as "fluent compositions."

A general object of the invention is to provide improved and efficient apparatus to be used in such devices which makes for efficient performance, ready operation, convenient cleaning, and which can be economically and easily made in commercial production.

A more particular object of the invention is the provision of a head adapted to be attached to a container for such devices, which is equipped with an improved charging valve unit of improved and simple construction and that can be readily and easily made, is positive in operation, will give efficient performance for an exceedingly long period of service and assures convenient and efficient cleaning thereof and associated structure.

A further object is the provision of such a charging valve unit which includes an efficient and simple valve structure which can be economically made and assembled, is positive in operation and will give efficient service for an unusually long time.

Another object of the invention is the provision in such a charging valve unit of a compressible cartridge sealing gasket of such dimension with relation to a mounting socket therefor as to remain efficiently and securely a part of the charging valve unit after assembly and during marketing and use thereof, and which is so formed as to permit its effective use without giving rise of substantial difficulties as a result of its secure mounting.

Other objects of the invention will in part be obvious and will in part appear hereinafter.

The invention accordingly comprises the features of construction, combination of elements, and arrangement of parts, which will be exemplified in the construction hereinafter set forth and the scope of the invention will be indicated in the claims.

For a fuller understanding of the nature and objects of the invention reference should be had to the following detailed description taken in connection with the accompanying drawing, in which:

Fig. 1 is a vertical sectional view taken along a medial line of the head of a liquid aerating and dispensing device embodying features of the invention;

Fig. 2 is a vertical sectional view on an enlarged scale of the charging valve unit of the present invention disassembled from the head shown in Fig. 1;

Fig. 3 is a bottom plan view of the metallic disc used in the unit shown in Fig. 2 to secure the valve member in position; and Fig. 4 is a vertical sectional view on an enlarged scale, with parts broken away, of the charging valve unit, showing the relative positions of the valve parts when gas under pressure is released through the unit.

Aerating and dispensing devices of the kind herein contemplated are useful in places such as soda fountains, restaurants, bakeries, private kitchens, beauty parlors, and the like. It is highly desirable, especially in public shops and places, that such devices be capable of being thoroughly cleaned with a minimum expenditure of time and effort, that they be sturdy, positive in operation, capable of long efficient service, easily charged and free from gas leakages. The present invention assures the attainment of these and other ends.

With the present device it is not necessary to keep the discharged cartridge screwed to the apparatus to prevent the charging valve from moving bodily in the inlet passage in the head and attendant leakage and it is therefore possible to effect successive charges with two or more cartridges, enabling larger containers to be employed when desired, and adding to the compactness and sightliness of the device while in dispensing use. As will be seen, the present construction affords a leak-proof seal during charging while avoiding any tendency for the charging valve device to grip the cartridge which would make it difficult to remove an empty cartridge and might result in disassembly and destruction of parts.

Further, the charging valve device is a unitary structure, all the parts of which can be easily removed together from the head by one simple operation for ease in cleaning or substitution and its structure is such as to assure ready and sanitary cleaning. The cartridge sealing gasket is so constructed as to remain snugly in its seat yet will permit such compression thereof as to assure an efficient seal around the cartridge mouth, piercing pin and gas passage through the head to avoid leakage. The back-pressure valve is positive in operation and is not readily subject to clogging by the contents of the container. These and other meritorious features and characteristics of the apparatus of the invention will be apparent from the description of the structure shown in the drawing by way of example, wherein like numerals refer to like parts throughout.

Referring to the drawing, there is shown in Fig. 1 a charging and dispensing head generally designated 10 having a gas inlet passage 11, a fluent composition outlet passage 12 and a needle valve passage 13. The inlet and outlet passages lead to the interior of a threaded cap portion 14. The latter is adapted to be screwed over the correspondingly threaded neck of a fluent composition container of usual construction (not shown) to provide a closure for the latter and is adapted to clamp the upper gasket of a siphon tube, of known construction (not shown) between such neck and the interior surface of the cap, with the tube in communication with passages 11 and 12.

The cap portion may be externally threaded for attachment to some types of containers, in which case the siphon tube may be associated with the head in any suitable manner. When the head is attached to one among a number of alined soda-fountain containers it may preferably carry a locating lug, such as 15, adapted to engage a notch or lug on the container located so as properly to orient the dispensing spout.

The head 10 and particularly its cap portion 14 may, when desired, be enlarged downwardly .o include an external skirt portion (not illustrated) so as to act not only as a closure for a container, but as a considerable portion of the container itself. Accordingly, it will be understood that the term "head" as employed in the present description and claims, refers to an element associated with or even forming part of a container for the substance under aeration.

The inlet or charging passage 11 extends outwardly through a neck portion 16, the outer end of which is exteriorly threaded as shown to accommodate a cartridge holder 17. These threads are of high pitch, on the order of from eight to four threads to the inch, to enable the cartridge holder rapidly to drive its contained cartridge 18 to gas discharging position. This construction has the advantage of enabling the operator to drive the cartridge into sealed communication with the charging valve piercing pin, hereinafter described, almost instantaneously with a single quick turn of the cartridge holder, thus avoiding leakages previously encountered through relatively slow penetration of the cartridge by the piercing pin. It is contemplated that other suitable means for obtaining this rapid cartridge seating action, not forming a part of the invention, may be provided.

The outer end of the neck 16 is also interiorly threaded for reception of a charging valve unit 19 of the invention. This unit includes a sleeve member formed of metal or other rigid material, preferably comprising an enlarged outer end 20 which is externally threaded at 21 for insertion into the interiorly threaded outer end of the neck 16, a neck portion 22 of less diameter and an intermediate restricted portion 23 for accommodating a gasket 123 adapted snugly to fit the restricted portion for movement with the charging valve unit.

The enlarged portion 20 is provided with a cylindrical socket or chamber 24 therein having a restricted opening 25 to accommodate the neck of cartridge 18. Within the socket 24 is snugly fitted a readily compressible cartridge sealing gasket 26 formed from rubber or the like. The lower end of the neck portion 22 is provided with a recess 27 and a gas conducting passage 28 extending from the recess 27 to the socket 24. The passage 28 preferably is enlarged at its upper end adjacent socket 24 to accommodate the shank of a piercing pin 29 and to provide a locating shoulder 30 therefor. The outer end 31 of the piercing pin 29 is bevelled or sharpened to penetrate the metal sealing diaphragm of cartridge 18 when the latter is forcibly urged thereagainst. A groove 32 is provided circumferentially around the pin 29 for the purpose of anchorage and a passage 33 through the pin constitutes a continuation of the gas conducting passage 28.

The piercing pin 29, preferably made separately from the sleeve member, is anchored in position centrally of the socket 24 with the piercing end thereof extending thereinto but short of the outer end of the enlarged sleeve portion 20 by positioning the shank thereof in the enlarged portion of the passage 28 with the bottom end of the pin abutting the shoulder 30, and then spinning a groove 34 in the bottom face of the socket 24 around the pin to force metal of the sleeve within the circumferential groove 32.

The gasket 26 fits snugly within the socket 24 and may be made slightly oversize. At most the gasket 26 is made with a clearance of only a few thousandths of an inch. This is for the purpose of assuring that the gasket will not become accidentally freed from the sleeve. Accordingly, to provide for proper compression of the gasket 26 by the neck of the cartridge 18 when driven home, to assure that the metal sealing diaphragm of the cartridge will be pierced by the piercing end of the pin 29, provision is made for permitting flow of the rubber to obtain the necessary depression of the upper face of the gasket. This is accomplished by forming a recess in gasket 26 to act as an expansion chamber. Preferably this is accomplished by enlarging the hole 35 therethrough at its inner end to form an unoccupied recess or expansion chamber 36 around the shank of the pin 29 adjacent the bottom of socket 24.

A back-pressure valve for closing the passage 28 is provided in the recess 27. This valve consists of a tapered seat 37 preferably conical in shape which forms the walls of the inner end of the passage 28 as it communicates with the recess 27. A tapered valve plug 38, preferably of resilient material such as rubber, is positioned in the recess 27 and is held in position against the seat 37, preferably by a concave metallic disk 39 fixed in the recess 27 by spinning over the edges of the end of the sleeve portion 22 at 40.

The metallic disk 39, as shown in Fig. 3, is provided with a plurality of holes 41—41, preferably four, symmetrically located from the center of the disk a distance greater than the radius of the base of the plug 38. The four holes 41—41 are connected by three slits 42, 42, 42 to provide a leaf spring 43 adapted to bear against the base of the plug 38 as shown in Fig. 2 thereby biasing the plug 38 against its seat 37. Back pressure in the container, when the head carrying the charging valve unit 19 is positioned thereon, cooperates with the leaf spring 43 to hold the plug 38 against the seat 37 and to close the passage 28 thereby preventing leakage of gas and container contents.

The entire charging valve unit 19 is insertable within the internally threaded outer end of the neck portion 16 in a single operation, suitable notches 44 being provided in the outer edge of the portion 20 to facilitate use of a screw-driver for this purpose. When this unit is screwed into position with the gasket 123 firmly in place between the head 10 and the valve sleeve member, the valve and piercing pin elements are firmly held in place by rigid parts and cannot yield bodily outwardly under back pressure obtaining within the container. This prevents any seepage of gas around the outside of the charging valve unit while the back-pressure valve closing the passage through the unit prevents any back flow therethrough.

During the charging operation the cartridge 18, which contains a suitable gas under pressure, is loaded in the holder 17 through the open internally threaded end thereof and the holder is then screwed down over the externally threaded neck portion 16 until the end of the cartridge abuts the outer face of gasket 26. A quick turn on the cartridge holder then forces the neck of the cartridge down to compass and depress the sealing gasket 26 so that the piercing end of the pin 29 extends beyond the outer face of the gasket and the cartridge sealing diaphragm is forced against the piercing pin and punctured thereby. The gas released from the cartridge builds up a pressure in the passage 28 greater than the pressure in the container. Accordingly the gas under pressure in the passage 28 unseats plug 38 permitting gas to flow between the surfaces of the plug and the seat 37, and through the disk 39 by means of the holes 41—41 and slits 42—42, the leaf spring 43 having been sprung outwardly away from the main body of the disk 39 by means of the gas pressure on the plug 38 and the spring member itself. The relative positions of these parts during such charging operation are shown in Fig. 4. The gas then passes downwardly through the passage 11 and the siphon tube into the container.

A dispensing valve may comprise any suitable structure but preferably is of such construction as to be removable from the head 10 as a unit to facilitate cleaning operations. The structure shown consists of a valve stem 45 terminating in a conical valve surface adapted to seat against a conical valve seat 46 provided in the outlet passage 12 where the latter meets the valve passage 13. The valve stem is threaded at 47 and the threads are screwed into the gland or bushing member 48 which in turn is threaded at 49 into the valve passage 13. The end of the gland member 48 firmly abuts a rubber washer 50 and is preferably recessed to provide a stop shoulder for a split ring 51 carried in a groove on the valve stem 45 to serve as a stop. The valve stem 45 is provided with a hand wheel 52 or the like fixed thereto so that the stem may be rotated to effect the opening and closing of the valve.

In order to clean the device only two major parts need be removed from the head 10, namely the charging valve unit 19 threaded into place in the neck 16 and the dispensing valve unit threaded into place at 49 and these can each be removed in a single unscrewing operation. The head 10 is then free of all extraneous parts and may easily be flushed with water as can the unitary dispensing valve unit and the unitary charging valve. The reassembly of the charging valve and dispensing valve units is similarly easy and quick, requiring only the two mentioned screwing operations.

It will be seen that the construction is simple and rugged and involves a minimum number of parts which are adapted readily and easily to be taken apart and put together. The charging valve unit is firmly and rigidly held in place by metal parts and affords a leak-proof seal which cannot be disrupted under back pressure and which does not require continued engagement by the cartridge to keep it in leak-proof condition. The back-pressure valve structure in the charging valve unit is particularly adapted to positive operation, continued and efficient service and is relatively free from any tendency to be clogged by contents of the container. The tapered seat 37 and plug 39 provide a gas passage which forms a continuation of the passage 28 relatively free from sharp bends and angles. The surfaces of the seat and of the sides of the plug are preferably those of frustums of right circular cones of which the generatrix is at a relatively small acute angle to the axis, so that the plug has a steeply sloping surface. The top surface of the plug is preferably of small area as shown.

Although a hollow piercing pin is preferred obviously the invention may be practiced with the use of other forms of piercing pins. For example a pointed solid piercing pin may be used, suitable provision for passage of gas under pressure from the socket 24 adjacent the root of the pin to the passage 28 being made. Longitudinal grooves may be formed in the pin extending from near its point to the root thereof to communicate with the passage 28, or a pin with an enlarged sharpened head and reduced shank may be provided with suitable provision for the passage 28 to communicate with the socket 24 near the base of the shank of the pin.

It will be understood that the use of the apparatus of the invention is not limited to the aerating and dispensing of any particular classes of compositions, it being suitable for use in connection with the aerating and dispensing of any fluent substance which can be and is desired to be aerated by gas under pressure and dispensed in aerated condition.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. A charging valve unit adapted to be fitted in an inlet passage of an aerating and dispensing device, which unit has an outer end adapted to be brought into communication with a gas containing cartridge and an inner end adapted to be in communication with the interior of the device when the unit is mounted in position, comprising, as sleeve of rigid material, a hollow piercing pin fixedly attached to said sleeve with the piercing end of the pin accessible to a cartridge when the latter is brought into communication with the outer end of the unit, a compressible cartridge sealing gasket carried snugly within said sleeve and surrounding the piercing end of said pin, said gasket having an unoccupied recess in the base thereof around the shank of said pin to constitute an expansion chamber, and a back-pressure valve fixedly attached to said sleeve inwardly of said hollow pin in communication with the passage therethrough; said valve comprising a tapered seat in said sleeve, a tapered plug of resilient material adapted to cooperate with the seat, and a spring member fixed to said sleeve biasing said plug against the seat.

2. A charging valve unit adapted to be fitted in an inlet passage of an aerating and dispensing device, which unit has an outer end adapted to be brought into communication with a gas containing cartridge and an inner end adapted to be in communication with the interior of the device when the unit is mounted in position, comprising, a sleeve of rigid material, a hollow piercing pin fixedly attached to said sleeve with the piercing end of the pin accessible to a cartridge when the latter is brought into communication with the outer end of the unit, a compressible cartridge sealing gasket carried snugly within said sleeve and surrounding the piercing end of said pin, said gasket having an unoccupied recess in the base thereof around the shank of said pin to constitute an expansion chamber, and a back-pressure valve fixedly attached to said sleeve inwardly of said hollow pin in communication with the passage therethrough; said valve being located in a recess in the inner end of the sleeve and comprising a tapered seat in the latter recess, a tapered plug of resilient material adapted to cooperate with the seat, and a metallic disk fixed in the latter recess said disk having a mid-portion thereof severed to form a leaf spring biasing said plug against said seat and to provide a gas passage through said disk.

3. A charging valve unit adapted to be fitted in an inlet passage of an aerating and dispensing device, comprising, a metallic member having a cylindrical socket in the outer end thereof, a cartridge piercing pin centrally mounted in the bottom of the socket extending short of the outer end thereof, a gas conducting passage extending through said member from the socket to the inner end of the member, a back-pressure valve supported on said member to close the passage, and a substantially cylindrical compressible cartridge sealing gasket carried snugly within the socket with said pin received in the hole therethrough, said gasket extending beyond the piercing end of said pin and having its hole enlarged adjacent the base of said pin to form an unoccupied recess constituting an expansion chamber.

4. A charging valve unit adapted to be fitted in an inlet passage of an aerating and dispensing device, which unit has an outer end adapted to be brought into communication with a gas containing cartridge and an inner end adapted to be in communication with the interior of the device when the unit is mounted in position, comprising, a metallic sleeve having a cylindrical socket in the outer end thereof, a gas conducting passage extending through said sleeve from the center of the base of the socket to a recess in the inner end of said sleeve, a hollow cartridge piercing pin fixed in the passage with its piercing end extending into the socket but short of the outer end thereof, a comprssible cartridge sealing gasket carried snugly within the socket with said pin received in the hole therethrough which is enlarged at its inner end to form an unoccupied recess constituting an expansion chamber around the base of the pin, a conically tapered seat in the inner end of the passage, a tapered plug of resilient material located in the recess in the end of said sleeve and adapted to cooperate with the seat, and a metallic disk fixed in the latter recess, said disk having a mid-portion thereof severed to form a leaf spring biasing said plug against said seat and to provide a gas passage through said disk.

CHARLES DAVIS THOMS.